United States Patent
Stallmann

(10) Patent No.: US 9,726,375 B2
(45) Date of Patent: Aug. 8, 2017

(54) OXY FUEL BOILER SYSTEM AND A METHOD OF OPERATING THE SAME

(71) Applicant: ALSTOM Technology Ltd, Baden (CH)

(72) Inventor: Olaf Stallmann, Essenheim (DE)

(73) Assignee: General Electric Technology GmbH, Baden (CH)

( * ) Notice: Subject to any disclaimer, the term of this patent is extended or adjusted under 35 U.S.C. 154(b) by 801 days.

(21) Appl. No.: 14/056,055

(22) Filed: Oct. 17, 2013

(65) Prior Publication Data

US 2014/0106284 A1    Apr. 17, 2014

(30) Foreign Application Priority Data

Oct. 17, 2012 (EP) .................................. 12188827

(51) Int. Cl.
| | |
|---|---|
| *F23N 3/00* | (2006.01) |
| *F23J 11/00* | (2006.01) |
| *F23L 7/00* | (2006.01) |
| *F23J 15/00* | (2006.01) |
| *F23J 15/06* | (2006.01) |
| *F23N 3/08* | (2006.01) |
| *B01D 53/00* | (2006.01) |

(52) U.S. Cl.
CPC .............. *F23N 3/002* (2013.01); *F23J 11/00* (2013.01); *F23J 15/00* (2013.01); *F23J 15/006* (2013.01); *F23J 15/06* (2013.01); *F23L 7/007* (2013.01); *F23N 3/085* (2013.01); *B01D 53/002* (2013.01); *B01D 2256/22* (2013.01); *F23J 2215/50* (2013.01); *F23J 2900/15061* (2013.01); *Y02C 10/04* (2013.01); *Y02E 20/344* (2013.01)

(58) Field of Classification Search
CPC .......... F23D 14/66; F23J 15/006; F23N 3/085
See application file for complete search history.

(56) References Cited

U.S. PATENT DOCUMENTS

| | | |
|---|---|---|
| 2,663,144 A | 12/1953 | Nordström et al. |
| 2,809,922 A | 10/1957 | Berg et al. |
| 2,849,379 A | 8/1958 | Hengstebeck |
| 4,593,202 A | 6/1986 | Dickinson |

(Continued)

FOREIGN PATENT DOCUMENTS

| | | |
|---|---|---|
| CN | 102016241 A | 4/2011 |
| CN | 102380281 A | 3/2012 |

(Continued)

*Primary Examiner* — Avinash Savani
*Assistant Examiner* — Rabeeul Zuberi
(74) *Attorney, Agent, or Firm* — GE Global Patent Operation; Cynthia W. Flanigan

(57) ABSTRACT

The present disclosure relates to a boiler system that includes an oxyfuel boiler in which a stream of oxygen and a fuel are combusted to generate a stream of flue gas. A flue gas condenser condenses the cleaned flue gas. A flue gas compression unit produces a stream of pressurized carbon dioxide rich flue gas. A pressure control system measures and controls the pressure after the flue gas conditioning system to a predetermined set value. A flow control system measures and controls the flow after the flue gas compression unit to a predetermined set value. The present disclosure further relates to a method of operating such a boiler system for an oxy-fuel process as well as to a power plant comprising such a system.

16 Claims, 1 Drawing Sheet

(56) References Cited

U.S. PATENT DOCUMENTS

| | | | |
|---|---|---|---|
| 4,787,915 A | 11/1988 | Meyer et al. | |
| 5,133,190 A | 7/1992 | Abdelmalek | |
| 5,974,829 A | 11/1999 | Novak et al. | |
| 8,128,728 B2 | 3/2012 | Tsangaris et al. | |
| 2009/0075219 A1 | 3/2009 | Vilagines et al. | |
| 2009/0297993 A1* | 12/2009 | Fan | F22B 35/001 |
| | | | 431/4 |
| 2010/0122526 A1* | 5/2010 | VanderVeen | B01D 53/8696 |
| | | | 60/286 |
| 2011/0130883 A1* | 6/2011 | Van Dijk | F04D 25/04 |
| | | | 700/282 |
| 2011/0209786 A1 | 9/2011 | Rasmussen et al. | |

FOREIGN PATENT DOCUMENTS

| | | |
|---|---|---|
| CN | 102460019 A | 5/2012 |
| GB | 2476899 | 10/2011 |
| WO | 00/76629 | 12/2000 |
| WO | 2004/035187 | 4/2004 |
| WO | 2008/011213 | 1/2008 |
| WO | 2010/031162 | 3/2010 |
| WO | 2011/141296 | 11/2011 |
| WO | 2012/076902 | 6/2012 |

* cited by examiner

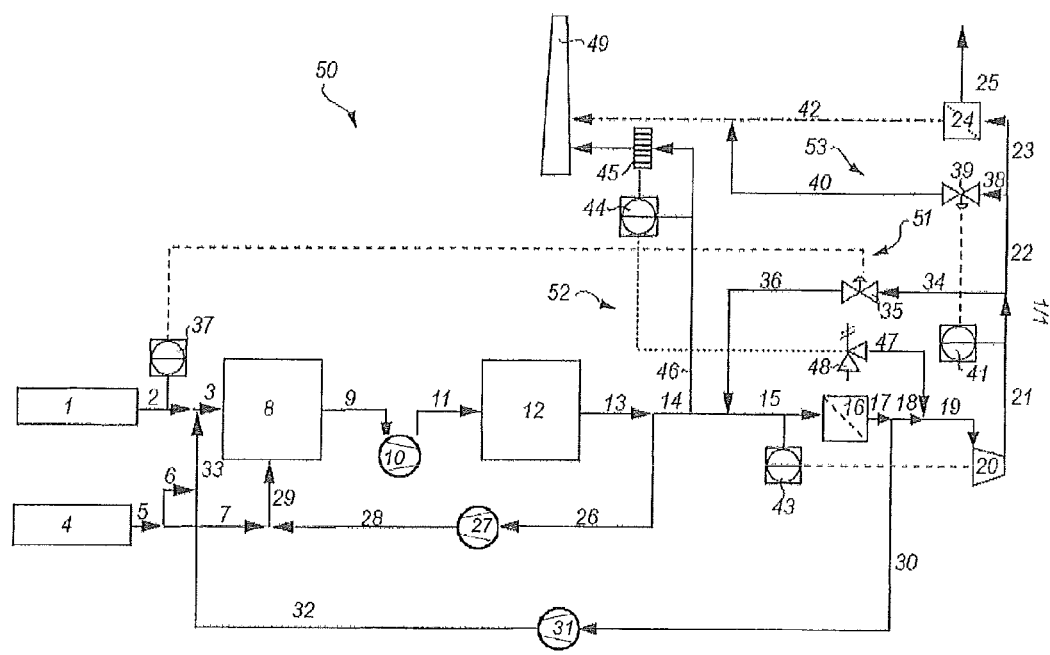

OXY FUEL BOILER SYSTEM AND A METHOD OF OPERATING THE SAME

CROSS-REFERENCE TO RELATED APPLICATIONS

This application claims priority to European application 12188827.5 filed Oct. 17, 2012, the contents of which are hereby incorporated in its entirety.

TECHNICAL FIELD

This disclosure is related to an oxy-fuel boiler system and a way of operating such a system.

BACKGROUND

In the combustion of a fuel, such as coal, oil, peat, waste, etc., in a combustion plant, such as a power plant, a hot process gas is generated, such process gas containing, among other components, carbon dioxide $CO_2$. With increasing environmental demands various processes for removing carbon dioxide from the process gas have been developed. One such process is the so called oxy-fuel process. In an oxy-fuel process a fuel, such as one of the fuels mentioned above, is combusted in the presence of a nitrogen-lean gas. Oxygen gas, which may provided by an air separation unit, is supplied to a boiler in which the oxygen gas oxidizes the fuel. In the oxy-fuel combustion process a carbon dioxide rich flue gas is produced, which can be treated using various $CO_2$ capture technologies in order to reduce the emission of carbon dioxide into the atmosphere.

Further, $CO_2$ capture often comprises cooling, or compression and cooling, of the flue gas to separate $CO_2$ in liquid form from non-condensable flue gas components, such as $N_2$ and $O_2$.

After purification and separation of carbon dioxide, a carbon dioxide rich stream is obtained and need to be handled, such as by storing and transportation in tanks (stationary or on a truck or ship), transporting via pipelines and/or pumping into the ground for prolonged (definitive) storage and mineralisation.

Different components used in an oxy-fuel process may not always be used to their full capacity. Components downstream of the boiler are designed in view of the output from the boiler. Some of the apparatuses used in an oxy-fuel process are thus oversized since the oxy-fuel process not always is operated at full capacity all the time. One such apparatus may be the compressors in the gas processing unit (GPU) acting on the carbon dioxide rich flue gas stream. The operating range of any compressor is limited on the high flow side of the choke region and on the low flow side by surge. For example big centrifugal compressors are limited in turn down to about 75% of their nominal capacity. To achieve a further capacity reduction and avoid surge bypass arrangements may be used, wherein a part of the compressed carbon dioxide stream exiting a compressor is recirculated back to the inlet of the compressor in order to keep a certain volume flow over the compressor. However, in the event of compressor failure such a bypass is normally fully opened to ensure the gas flow to the machine. In oxyfuel systems compressor failure resulting in fully opened bypass would lead to pressure peaks within the system which may damage the equipment and thus affect the entire power plant. Also, the inventory stored downstream of the compressor discharge may be enough to lead to pressure peaks that change the power plant regime from underpressure to overpressure when recirculated back via the fully opened bypass.

The issue with pressure peaks arising upon compressor failure is at present a problem. A pressure peak may also adversely affect the flame stability in the oxyfuel boiler. It is to be noted that compressor trips most likely will lead to power plant trips. Currently there are no systems on the market that have a reliability to prevent potential peaks.

There is always a need to improve the flexibility of an oxy-fuel process. It would be desirable to find new ways to ensure more a stable operation, scale down the size/capacity of the components and better and more securely utilize the components present in an oxy-fuel process.

SUMMARY

With the present invention the possible pressure peaks that might appear in the process are diminished or further diminished, if not avoided completely, and thus power plant trips may be avoided.

By using a different way of controlling the capacity of the flue gas compressor the issue with pressure peaks arising upon compressor failure is reduced. This ensures that at all times compressor damage due to too low flow can be avoided. Also, pressure peaks that may result in a change from underpressure to over pressure upstream in the power plant may be fully avoided. Thus provided is a way to improve the flexibility of an oxy-fuel process. Optionally also a feed forward control may be incorporated to ensure a more stable plant operation.

An object of the present invention is to provide a boiler system comprising an oxyfuel boiler in which a stream of oxygen and a fuel are combusted to generate a stream of flue gas, a flue gas condenser for condensing the cleaned flue gas, a flue gas compression unit for producing a stream of pressurized carbon dioxide rich flue gas, a pressure control system in which the pressure before the flue gas condenser (e.g. after the flue gas conditioning system) is measured and controlled to at least one predetermined set value, and a flow control system in which the flow after the flue gas compression unit is measured and controlled to a predetermined set value. A predetermined set value of the pressure control system is dependent on the process set up. As an example the control range for compressor operation is between −15 to +60 mbar. A predetermined set value of the flow control system is dependent on the type of compressor including manufacturer and model of the compressor and is preferably to be chosen to be at least 5% above the compressor surge point trip.

According to one embodiment the boiler system may also include a recirculation system, operative at least for a period of time in a recirculation mode, in which at least a part of the carbon dioxide stream from a flue gas compression unit is returned to the inlet of the flue gas condenser unit. In the recirculation system at least a part of a carbon dioxide stream from a flue gas compression unit is forwarded as a stream to the inlet of the flue gas condenser unit or is incorporated into a stream containing carbon dioxide from the flue gas conditioning unit entering the flue gas condenser unit.

According to one embodiment the boiler system, further comprises a recirculation controlling device and a recirculation regulating device which controls the recirculation system to operate in the recirculation mode based on a measured load on the boiler system.

According to one embodiment the boiler system the recirculation regulating device is also responsible for expanding a carbon dioxide stream.

According to one embodiment the flow control further comprises a flow controlling device and a flow regulating device which controls a bypass stream to operate in a bypass mode based on a measured flow value in the boiler system after the flue gas compression unit.

According to one embodiment the pressure control system further comprises a pressure controlling device and a high pressure regulating device which controls an evacuation stream to operate in an evacuation mode based on a measured pressure value in the boiler system before the flue gas compression unit.

According to one embodiment the pressure control system further comprises a low pressure regulating device which together with the pressure controlling device controls an air stream from the atmosphere to operate in an air inlet mode based on a measured pressure value in the boiler system before the flue gas compression unit.

An object of the present invention is to provide a method of operating a boiler system comprising an oxy-fuel boiler in which an oxygen stream and a fuel stream are combusted to generate a flue gas stream, a flue gas condenser for condensing the cleaned flue gas, a flue gas compression unit for producing a stream of pressurized carbon dioxide rich flue gas, said method comprising:
monitoring the pressure before the flue gas condenser (e.g. after the flue gas conditioning system) and controlling the pressure before the flue gas compression unit to at least one predetermined set value by a pressure control system, and monitoring the flow after the flue gas compression unit, and controlling the flow after the flue gas compression unit (e.g. before carbon dioxide separation unit) to a predetermined set value by a flow control system.

According to one embodiment the method includes operating the boiler system, at least for a period of time, in a recirculation mode, during which at least a part of a carbon dioxide stream from the flue gas compression unit is returned to the inlet of the flue gas condenser unit. Further, in the recirculation mode, the recirculation regulating device include may also be responsible for expanding a carbon dioxide stream.

According to one embodiment the method, further comprises:
establishing whether the boiler system operates at a first load or at a second load,
wherein the second load is a lower load than the first load, controlling the boiler system to operate in the recirculation mode when the boiler system operates at the second load, and controlling the boiler system to stop operation in the recirculation mode when the boiler system operates at the first load.

According to one embodiment recirculation mode of the boiler system is controlled using a recirculation controlling device and a regulating device.

According to one embodiment the measured load on the boiler system is measured on a stream from a fuel storage before the oxyfuel boiler.

According to one embodiment the flow control system establishes the flow value at which the boiler system operates, and controls the boiler system to operate in a bypass mode when the boiler system operates at a flow value below the predetermined set flow value, and controls the boiler system to stop operation in the bypass mode when the boiler system operates at or above the predetermined set flow value, said bypass mode including forwarding at least a part of a carbon dioxide stream from the flue gas compression unit as a stream to a stack or to a stream from a carbon dioxide separation unit forwarded to the stack.

According to one embodiment the bypass mode of the boiler system is controlled using a flow controlling device and a flow regulating device.

According to one embodiment the pressure control system establishes the pressure value at which the boiler system operates, and controls the boiler system to operate in an evacuation mode when the boiler system operates at a pressure value above a predetermined first set value, and controls the boiler system to stop operation in the evacuation mode when the boiler system operates at or below the predetermined first set value, said evacuation mode including forwarding at least part of a carbon dioxide containing stream from a flue gas conditioning unit as a stream to the stack.

According to one embodiment the pressure control system establishes the pressure value at which the boiler system operates, and controls the boiler system to operate in an air inlet mode when the boiler system operates at a pressure value below a predetermined second set value, and controls the boiler system to stop operation in the air inlet mode when the boiler system operates at or above the predetermined second set value, said air inlet mode including introducing air from the atmosphere as a stream to at least part of a carbon dioxide containing stream from the flue gas condenser unit to be forwarded to the flue gas compression unit.

According to one embodiment the evacuation mode of the boiler system is controlled using a pressure controlling device and a high pressure regulating device.

According to one embodiment the air inlet mode of the boiler system is controlled using a pressure controlling device and a low pressure regulating device.

According to one embodiment the predetermined first set value for pressure is higher than the predetermined second set value.

An object of the present invention is to provide an oxy-fuel combustion power plant comprising the above mentioned boiler system.

BRIEF DESCRIPTION OF THE DRAWINGS

Referring now to the FIGURES, which are exemplary embodiments, and wherein the like elements are numbered alike:

FIG. 1 is a schematic view of a boiler system 50 in an oxy-fuel process, disclosing one embodiment of a recirculation system and a pressure and volume flow control system according to the present disclosure.

DETAILED DESCRIPTION

Provided is an oxy-fuel process with better operability and higher safety.

A boiler system is configured to be capable of operating at full capacity, thus both the boiler and compression unit is adapted for this situation. In case of a failure within the system such as a compressor failure a sufficient volume flow over the compressor unit is needed but without causing high pressure peaks within the system.

To ensure a sufficient flow over the compression unit two controlling systems, a flow control system and a pressure control system, are provided. These control systems include controlling devices, e.g. actuators. One controlling device is controlling by opening the discharge of the compressor. Another controlling device is controlling by opening regulating devices, e.g. louvers or curtains, in the stack connection or a dedicated line from the atmosphere. By using said two controlling devices compressor damage due to too low flow over the compression unit may be avoided and also damage to equipment downstream and upstream of the flue gas compression unit due to pressure or flow differences may be avoided. The two controlling systems, the flow control system and the pressure control system, may work separately or together.

Also, in order to keep a high carbon dioxide concentration in the flue gas and not to mix it with air in case of low capacities a recirculation, i.e. bypass, stream is used. The bypass stream is controlled using the power plant capacity, i.e. the ingoing fuel amount, as set point trigger.

Using the construction with the two controlling systems and the recirculation system the bypass may be reduced in size having only to cover a capacity between 30 to 75%. A capacity of about 30% may be considered a minimum for operating an oxyfuel plant. Previously a bypass stream was needed to be constructed for a recirculation of the full flow. With the present method the capacity window needed to be covered is considerably decreased.

The use of the flow and pressure control systems and the recirculation system reduces the pressure peaks in case of failure, e.g. a valve failure, while keeping the compressor capacity control. Also an optional feed forward control may make the plant operation more stable.

Provided is a boiler system comprising an oxyfuel boiler in which a stream of oxygen and a fuel are combusted to generate a stream of flue gas,
a flue gas condenser for condensing the cleaned flue gas, a flue gas compression unit for producing a stream of pressurized carbon dioxide rich flue gas, a pressure control system in which the pressure after the flue gas conditioning system is measured and controlled to at least one predetermined set value, and a flow control system in which the flow after the flue gas compression unit is measured and controlled to a predetermined set value. The boiler system may also comprise an air separation unit producing the stream of oxygen for the boiler, and a flue gas conditioning system for cleaning at least a portion of flue gas generated in the boiler. A carbon dioxide separation unit may be incorporated for producing the stream of pressurized carbon dioxide end product. The boiler system may also incorporate a stack to the atmosphere. Further, a recirculation system, operative at least for a period of time in a recirculation mode, in which at least a part of the carbon dioxide stream from a flue gas compression unit is returned to the inlet of the flue gas condenser unit may be incorporated in to the boiler system.

The boiler system comprising the oxy-fuel boiler in which oxygen and fuel are combusted to generate a flue gas stream, the flue gas condenser, the flue gas compression unit, may be operated by monitoring the pressure after the flue gas conditioning system and controlling the pressure before the flue gas compression unit to at least one predetermined set value by a pressure control system, and monitoring the flow after the flue gas compression unit and controlling the flow before carbon dioxide separation unit to a predetermined set value by a flow control system.

However, the method of operating the boiler system may also include operating the boiler system, at least for a period of time, in a recirculation mode, during which at least a part of a carbon dioxide stream from the flue gas compression unit is returned to the inlet of the flue gas condenser unit.

The present method establishes the load at which the boiler system operates. By providing limit values on the load for when the recirculation mode is to be active, the method is switching between an inactive and active mode based on a load value measured in the process during operation. The load value is the set point of the power plant capacity. By directly or indirectly measuring e.g. the amount of ingoing fuel into the boiler, power consumption of the fuel pump, oxygen demand (e.g. weight or volume flow of oxygen forwarded to the boiler), electrical power output, demand from the grid, flue gas flow rate, flue gas volumetric flow rate, steam production and/or temperatures of the process, the capacity of the boiler system is established. The recirculation mode is to be active during a low load on the boiler system. The load on the boiler system is considered low when the load is below 75% of maximum capacity of the boiler, e.g. 30-75%.

The load on the boiler system could be measured and controlled using the flow of fuel to the boiler or the oxygen demand to the boiler. The load on the flue gas compression unit could be measured using the operating point of the flue gas compression unit. The load of big centrifugal compressors is measured typically via the flowrate. Below a 75% load such machines are operated using recirculation to prevent damages to the equipment from surge conditions. A predetermined set point of a compressor, depending e.g. on the compressor's manufacturer and model, is generally in the range of 75% to 80% of the compressor's capacity. For certain compressor types, e.g. screw compressors or reciprocating ones, the range could be extended to 30 to 75%.

The limit values of the boiler system to operate in the recirculation mode are set as a first and a second load. The limit value for a first load may be set to at least 75% of maximum capacity of the boiler, at which the boiler system deactivates the recirculation mode. The limit value for a second load may be set to below 75% of maximum capacity of the boiler, at which the boiler system activates and operates in the recirculation mode.

The mode of operation of the boiler system is controlled by a controlling device, such as a computer, microprocessor or controller, which compares the value of a measured current load with the set limit values and then regulate the process accordingly.

The carbon dioxide rich streams of the gas processing unit (GPU) are controlled, e.g. in terms of temperature and/or flow. The liquid and gaseous carbon dioxide rich flue gas streams in the boiler system are forwarded by controlling the flow and pressure of carbon dioxide in a per se known manner.

By the term "carbon dioxide rich" used throughout the application text is meant that the gas stream referred to contains at least 40% by volume of carbon dioxide ($CO_2$).

The flue gas compression unit comprises at least one compressor having at least one, and typically two to ten compression stages for compressing the carbon dioxide rich flue gas from a preceding flue gas condenser unit. Each compression stage could be arranged as a separate unit. As an alternative, several compression stages could be operated by a common drive shaft. Further, the flue gas compression unit may also comprise intercoolers. Also, separators may be included to separate liquid phase from gaseous phase.

In order to keep the carbon dioxide concentration in the flue gas and not mix it with air in case of low capacities, a bypass stream is used. The carbon dioxide rich flue gas stream to be recirculated is taken from the flue gas compression unit upon exit from the flue gas compression unit.

The recirculation process and the system involved will now be disclosed more in detail with reference to FIG. 1. It is to be noted that not all streams or controlling means needed to operate an oxy-fuel process are disclosed in the FIGURE. The FIG. 1 is focusing on the main flow of the carbon dioxide rich flue gas stream, which is purified, cooled, compressed and separated, which flow is dependent of fluctuations in process load, in order to make the oxy-fuel process more flexible in terms of energy resource allocation, apparatus scaling and capacity.

FIG. 1 is a schematic representation of a boiler system 50, as seen from the side thereof. The boiler system 50 comprises, as main components, a boiler 8, being in this embodiment an oxy-fuel boiler, and a flue gas conditioning system 12, e.g. an air quality control system (AQCS). The flue gas conditioning system 12 comprises a particulate removal device, which may, for example, be a fabric filter or an electrostatic precipitator, and a sulphur dioxide removal system, which may be a wet scrubber.

A fuel, such as coal, oil, or peat, is contained in a fuel storage 1, and can be supplied to the boiler 8 via a supply stream 2, 3. An air separation unit (ASU) 4 is operative for providing oxygen gas in a manner which is known per se. An oxygen containing gas stream 5 from the air separation unit 4 is continuously, during operation of the boiler 8, fed into the boiler, as a steam 6 via a carbon dioxide containing stream 33 and/or as a steam 7 via a carbon dioxide containing stream 29. The produced oxygen gas to be feed to the boiler 8, comprises typically 90-99.9 vol. % oxygen, $O_2$. Re-circulation streams of flue gas, which contains carbon dioxide, to the boiler 8 is provided in the boiler system 50. The re-circulation of flue gas may be taken from a part of flue gas stream 13 after the flue gas conditioning system 12 as a $CO_2$ rich stream 26 and/or a part of flue gas stream 17 after a condenser unit 16 as a $CO_2$ rich stream 30. Both $CO_2$ rich streams 26 and 30 may be forwarded back to the boiler 8 using recirculation means 27 and 31, respectively. The recirculation means 27 and 31 may be recirculation fans. After the recirculation means 27 and 31, $CO_2$ rich streams 28 and 32, respectively, may be brought in contact with oxygen from the ASU 4. The re-circulation of flue gas and the oxygen gas is mixed with each other to form a gas mixture containing typically about 20-50% by volume of oxygen gas, the balance being mainly carbon dioxide and water vapour, upstream of the boiler 8. The $CO_2$ rich stream 28 may be mixed with oxygen containing gas stream 7 and/or the $CO_2$ rich stream 32 may be mixed with oxygen containing gas stream 6 before entry into the boiler 8. The boiler 8 is operative for combusting the fuel in the presence of the oxygen gas. The fuel which is supplied via the supply stream 2 may optionally be mixed with the $CO_2$ and oxygen containing gas stream 33, forming a stream 3 entering the boiler 8. The flow of oxygen streams 5,6,7 may be controlled by a controlling system which may e.g. comprise computer, micro processor, controller, valves, actuators and/or pumps, which system is not shown in the FIGURES for the purpose of maintaining clarity of the illustration. Controlling the flow of oxygen is done in a per se known manner. The flow of fuel stream 2 is controlled by a controlling system which may e.g. comprise computer, micro processor, controller, valves, actuators and/or pumps. Controlling the flow of fuel is done in a per se known manner. Disclosed herein is a recirculation controlling device 37, e.g. an actuator, designated for measuring the volume flow of the fuel forwarded to the boiler 8.

A stream 9 is forwarding carbon dioxide rich flue gas generated in the boiler 8 with the aid of a forwarding means 10, e.g. an induced draft fan, becoming a stream 11 before entry into a flue gas conditioning system 12. By "carbon dioxide rich flue gas" is meant that the flue gas leaving the boiler 8 via the stream 9 will contain at least 40% by volume of carbon dioxide, $CO_2$. Often more than 50% by volume of the flue gas leaving the boiler 8 will be carbon dioxide. Typically, the flue gas leaving boiler 8 will contain 50-80% by volume of carbon dioxide. The balance of the "carbon dioxide rich flue gas" will be about 15-40% by volume of water vapour ($H_2O$), 2-7% by volume of oxygen ($O_2$), since a slight oxygen excess is often preferred in the boiler 8, and totally about 0-10% by volume of other gases, including mainly nitrogen ($N_2$) and argon (Ar), since some leakage of air can seldom be completely avoided.

The carbon dioxide rich flue gas generated in the boiler 8 may typically comprise contaminants in the form of, for example, dust particles, hydrochloric acid, HCl, sulphur oxides, $SO_x$, and heavy metals, including mercury, Hg, that should be removed, at least partly, from the carbon dioxide rich flue gas prior to disposing of the carbon dioxide.

The flue gas conditioning system 12 removes in different steps most of the dust particles from the carbon dioxide rich flue gas and also sulphur dioxide, $SO_2$, and other acid gases from the carbon dioxide rich flue gas.

An at least partly cleaned carbon dioxide rich flue gas may be at least partly forwarded from the flue gas conditioning system 12 to a flue gas condenser 16. A $CO_2$ rich stream 13 exiting the flue gas conditioning system 12 may be divided and partly recirculated as the stream 26 back to the boiler 8. The remaining part of the $CO_2$ stream 13 exiting the flue gas conditioning system 12 being stream 14 may be forwarded as a stream 15, optionally comprising recirculated $CO_2$ via stream 36, into a flue gas condenser 16, e.g. a direct contact condenser. From the flue gas condenser 16 the flue gas is forwarded to a gas processing unit in the form of a gas compression unit 20 and separation unit 24 of the boiler system 27. In the gas processing unit the cleaned carbon dioxide rich flue gas is further cleaned and is compressed for disposal or further use.

The cleaned carbon dioxide enriched flue gas stream 17 exiting the flue gas condenser 16 may be divided and partly recirculated as the stream 30 back to the boiler 8. The remaining part of the $CO_2$ enriched stream 17 being stream 18 is forwarded as a stream 19 to the flue gas compression unit 20.

The flue gas compression unit 20 may comprise intercooling and separation steps.

A stream 21 forwards the compressed gas from the flue gas compression unit 20 towards a separation unit 24 in which a compressed carbon dioxide stream 25 is formed.

The stream 21 may during a low load on the system be partly recirculated to keep the flue gas compression unit running. At a low load on the boiler system 50 a recirculation system 51 is operating in a recirculation mode. If e.g. the boiler system 50 operates at a load value below a predetermined set value the recirculation system 51 is operating in a recirculation mode, and the boiler system 50 is controlled to stop operation in the recirculation mode when the boiler system 50 operates at or above the predetermined set value or a another predetermined set value. A part of the stream 21, stream 34 is controlled using a regulating device 35 to forward the enriched carbon dioxide as a stream 36 back to before the flue gas condenser. The stream 14 from the flue gas conditioning system 12 and the recirculated stream 36 forms stream 15 entering the flue gas condenser 16. The regulating device 35, e.g. a valve, is used to control the flow of said recirculation system using the recirculation controlling device 37. The recirculation controlling device 37 may be a computer, microprocessor or controller, which compares the value of a measured current load with the set limit values and then regulate the process accordingly. The regulating device 35 may also be used to expand the carbon dioxide.

Compressed carbon dioxide leaving the gas processing unit may be transported away for disposal, which is sometimes referred to as "$CO_2$ sequestration". The separation unit 24 includes the further cleaning and compression steps of a gas processing unit which e.g. may be selected from a trace substance removal unit, a drier unit, a flue gas economizer, a $CO_2$ condenser unit and a recompression unit.

As discussed above the oxy-fuel process may during operation be subjected to fluctuations. In order to obtain a better operability and higher safety two additional controlling systems are incorporated into the oxy-fuel process.

A pressure control system 52 is incorporated to measure and react to changes to the pressure within the system 50. A flow control system 53 is incorporated to measure and react to changes to the flow, e.g. volume flow, within the system 50.

One controlling device, pressure controlling device 44, responsive to changes of the pressure within the system and another controlling device, flow controlling device 41, responsive to volume flow changes within the system 50 are incorporated.

In the event there is a change in pressure, e.g. a sudden increase in pressure, a pressure peak caused by e.g. compressor or valve failure, the controlling device 44, e.g. a pressure switch, connected to a stream 46, at least partly made up of the carbon dioxide rich gas stream 14, reacts and controls a high pressure regulating device 45 to operate in an appropriate manner within the pressure control system 52. In such cases, the high pressure regulating device 45, e.g. regulating louvers or curtains, are used to open at a predetermined high pressure limit and to admit carbon dioxide containing flue gas, as a stream 46, to exit the system via a stack 49. Below said predetermined high pressure limit the high pressure regulating device 45 is closed.

In the event there is a change in pressure, e.g. a decrease in pressure, the controlling device 44 reacts and controls a low pressure regulating device 48 to operate in an appropriate manner. If there is a decrease in pressure in the system due to a failure within the system, the equipment must be protected against being subjected to an internal vacuum (i.e., low pressure) that is lower than the equipment can withstand. In such cases, the low pressure regulating device 48, e.g., a vacuum relief valve, is used to open at a predetermined low pressure limit and to admit air, as a stream 47, into the system. This breaks the formed underpressure in the system. Above said predetermined low pressure limit the low pressure regulating device 48 is closed. Although additional air within the system is not desirable, it is preferable to allow a small controlled volume into the system rather than allow the system and compressor(s) to collapse. Thus, stream 19 entering the flue gas compression unit 20 should always be of a sufficient pressure for the flue gas compression unit 20 to operate properly without causing damage.

The pressure control system 52 includes the pressure controlling device 44 and the high pressure regulating device 45 and the low pressure regulating device 48.

The pressure control system 52 establishes the pressure value at which the boiler system 50 operates, and controls the boiler system 50 to operate in an evacuation mode when the boiler system 50 operates at a pressure value above a predetermined first set value, and controls the boiler system 50 to stop operation in the evacuation mode when the boiler system 50 operates at or below the predetermined first set value, said evacuation mode including forwarding at least part of a carbon dioxide containing stream 13 from the flue gas conditioning unit 12 as a stream 46 to the stack 49.

The pressure value established by the pressure control system 52 may also be used to control the boiler system 50 to operate in an air inlet mode when the boiler system 50 operates at a pressure value below a predetermined second set value, and control the boiler system 50 to stop operation in the air inlet mode when the boiler system 50 operates at or above the predetermined second set value, said air inlet mode including introducing air from the atmosphere as a stream 47 to at least part of a carbon dioxide containing stream 17 from the flue gas condenser unit 16 to be forwarded to the flue gas compression unit 20.

The predetermined first set value for pressure is higher than the predetermined second set value.

In order to exemplify the use of the different operation modes, evacuation and air inlet mode, an example of an embodiment of the present method of operation is given below. Assuming the control range for compressor operation is between −15 to +60 mbar these end values may be used as said second and first set value, respectively. Thus, a measured pressure value on the boiler system 50 below or above such a range would trigger one of the modes above. If +60 mbar is the max control range for compressor operation and considered a first set value a pressure of +80 mbar would trigger the evacuation mode and forward at least part of a carbon dioxide containing stream 13 from the flue gas conditioning unit 12 as a stream 46 to the stack 49. When the pressure then returns to the first set value +60 mbar or below the evacuation mode is stopped. If −15 mbar is the minimum control range for compressor operation and considered a second set value a pressure of −30 mbar would trigger the air inlet mode and introducing air from the atmosphere as a stream 47 to at least part of a carbon dioxide containing stream 17 from the flue gas condenser unit 16 to be forwarded to the flue gas compression unit 20. When the pressure then returns to the second set value −15 mbar or above the air inlet mode is stopped.

In the event there is a change in the process e.g. a blockage downstream of the flue gas compression unit 20 due to a failure, shut down of the subsequent purification steps of the process, or a too low volume flow from the flue gas compression unit 20 which may cause damage on the apparatuses downstream of the flue gas compression unit 20, the controlling device 41, e.g. an actuator or a flow control, connected to the stream 21 of the compressed carbon dioxide rich flue gas, reacts and controls a regulating device 39 to operate in an appropriate manner. In such cases, the regulating device 39, e.g. a valve or a regulating louver or curtain, is used to open at a predetermined low volume flow limit and to admit at least a part of the carbon dioxide containing flue gas stream 22 as a stream 38, to be forwarded as a stream 40 to exit the system via the stack 49. Optionally the stream 40 is combined with a stream 42 exiting the separation unit 24 before being forwarded to the stack 49. The regulating device 39 may also be responsible for expanding the carbon dioxide stream 38. The control device 41 and regulating device 39 manipulates the flowing fluid to compensate for the load disturbance in the system and keep the regulated process variable as close as possible to a desired set point. Above said predetermined volume flow limit the regulating device 39 is closed.

The flow control system 53 includes the flow controlling device 41 and the flow regulating device 39. The flow control system 53 will operate in a bypass mode when the boiler system 50 operates at a flow value below a predetermined set flow value, and control the boiler system 50 to stop operation in the bypass mode when the boiler system 50 operates at or above the predetermined set flow value.

The herein disclosed incorporation of a recirculation system over the compression unit controlled using the power plant capacity, e.g. the feed flow rate of the fuel, as a set point trigger, a pressure control system responsive to an increase or decrease of the operating pressure of the process by either opening a dedicated line to the stack or a dedicated line from the atmosphere, respectively, and a volume flow control system responsive to e.g. a decrease of the operating flow of the process by opening a dedicated line to the stack results in an better operability and a higher safety within the oxy-fuel system.

The design of the recirculation bypass over the compressor unit may also be influenced, i.e. downsized, due to the bypass no longer must be able to recirculate the entire volume flow exiting the compressor unit.

The design of the recirculation bypass and the additional pressure and volume flow control systems reduces the pressure peaks in case of a failure within the system, e.g. a valve failure, while keeping the compressor capacity control. Pressure peaks that previously could result in a change from underpressure to overpressure upstream in the power plant may now be fully avoided.

It will be appreciated that numerous variants of the embodiments described above are possible within the scope of the appended claims.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A boiler system comprising
an oxyfuel boiler in which a stream of oxygen and a fuel are combusted to generate a stream of flue gas,
a flue gas compression unit for producing a stream of pressurized carbon dioxide rich flue gas,
a flue gas condenser for condensing cleaned flue gas,
a pressure control system in which the pressure before the flue gas condenser is measured and controlled to at least one predetermined set value, and
a flow control system in which the flow after the flue gas compression unit is measured and controlled to a predetermined set value,
wherein the pressure control system establishes a pressure value at which the boiler system operates, and controls the boiler system to operate in an air inlet mode when the pressure value at which the boiler system operates is below a predetermined first set value, and controls the boiler system to stop operation in the air inlet mode when the pressure value at which the boiler system operates is at or above the predetermined first set value, said air inlet mode including introducing air from the atmosphere as an air stream to at least part of a carbon dioxide containing stream from the flue gas condenser to be forwarded to the flue gas compression unit.

2. The boiler system according to claim 1, further comprising a recirculation system, operative at least for a period of time in a recirculation mode, in which at least a part of the stream from the flue gas compression unit is returned to an inlet of the flue gas condenser.

3. The boiler system according to claim 2, further comprising a recirculation controlling device and a recirculation regulating device which controls the recirculation system to operate in the recirculation mode based on a measured load on the boiler system.

4. The boiler system according to claim 1, wherein the flow control system further comprises a flow controlling device and a flow regulating device which controls a bypass stream to operate in a bypass mode based on a measured flow value in the boiler system after the flue gas compression unit.

5. The boiler system according to claim 1, wherein the pressure control system further comprises a pressure controlling device and a high pressure regulating device which controls an evacuation stream to operate in an evacuation mode based on a measured pressure value in the boiler system before the flue gas compression unit.

6. The boiler system according to claim 1, wherein the pressure control system further comprises a low pressure regulating device which together with the pressure controlling device controls an air stream from the atmosphere to operate in an air inlet mode based on a measured pressure value in the boiler system before the flue gas compression unit.

7. A method of operating a boiler system comprising an oxy-fuel boiler in which an oxygen stream and a fuel stream are combusted to generate a flue gas stream, a flue gas condenser for condensing cleaned flue gas, a flue gas compression unit for producing a stream of pressurized carbon dioxide rich flue gas, said method comprising:
monitoring the pressure before the flue gas condenser and controlling the pressure before the flue gas compression unit to at least one predetermined set value by a pressure control system, and
monitoring the flow after the flue gas compression unit, and controlling the flow after the flue gas compression unit to a predetermined set flow value by a flow control system,
wherein the pressure control system establishes a pressure value at which the boiler system operates, and controls the boiler system to operate in an air inlet mode when the pressure value at which the boiler system operates is below a predetermined first set value, and controls the boiler system to stop operation in the air inlet mode when the pressure value at which the boiler system operates is at or above the predetermined first set value, said air inlet mode including introducing air from the atmosphere as an air stream to at least part of a carbon dioxide containing stream from the flue gas condenser to be forwarded to the flue gas compression unit.

8. The method according to claim 7, further comprising operating the boiler system, at least for a period of time, in a recirculation mode, during which at least a part of a carbon dioxide stream from the flue gas compression unit is returned to an inlet of the flue gas condenser.

9. The method according to claim 7, further comprising:
establishing whether the boiler system operates at a first load or at a second load, wherein the second load is a lower load than the first load, controlling the boiler system to operate in a recirculation mode when the boiler system operates at the second load, and controlling the boiler system to stop operation in the recirculation mode when the boiler system operates at the first load.

10. The method according to claim 8, wherein the recirculation mode of the boiler system is controlled using a recirculation controlling device and a recirculation regulating device.

11. The method according to claim 7, wherein a measured load on the boiler system is measured on a stream from a fuel storage before the oxy-fuel boiler.

12. The method according to claim 7, wherein the flow control system establishes a flow value at which the boiler system operates, and controls the boiler system to operate in a bypass mode when the flow value at which the boiler system operates is below the predetermined set flow value, and controls the boiler system to stop operation in the bypass mode when the flow value at which the boiler system operates is at or above the predetermined set flow value, said bypass mode including forwarding at least a part of a carbon dioxide stream from the flue gas compression unit as an evacuation stream to a stack or to a stream from a carbon dioxide separation unit forwarded to the stack.

13. The method according to claim 12, wherein the bypass mode of the boiler system is controlled using a flow controlling device and a flow regulating device.

14. The method according to claim 7, wherein the pressure control system controls the boiler system to operate in an evacuation mode when the pressure value at which the boiler system operates is above a predetermined second set value, and controls the boiler system to stop operation in the evacuation mode when the pressure value at which the boiler system operates is at or below the predetermined second set value, said evacuation mode including forwarding at least part of a carbon dioxide containing stream from a flue gas conditioning unit as a stream to a stack.

15. The method according to claim 14, wherein the predetermined second set value for pressure is higher than the predetermined first set value.

16. An oxy-fuel combustion power plant comprising the system according to claim 1.

* * * * *